United States Patent Office 3,117,424
Patented Jan. 14, 1964

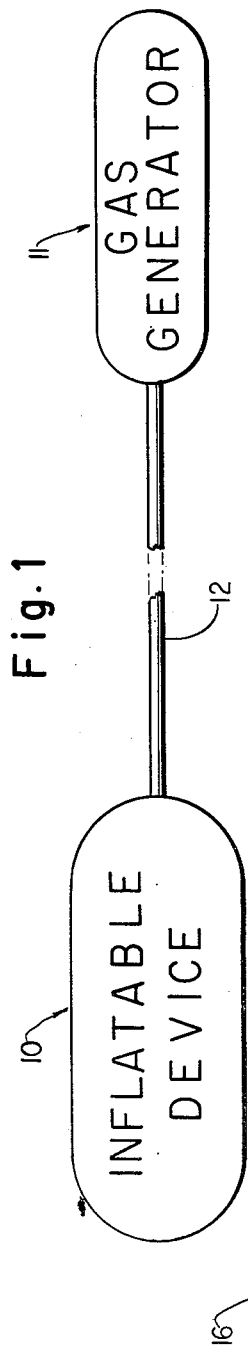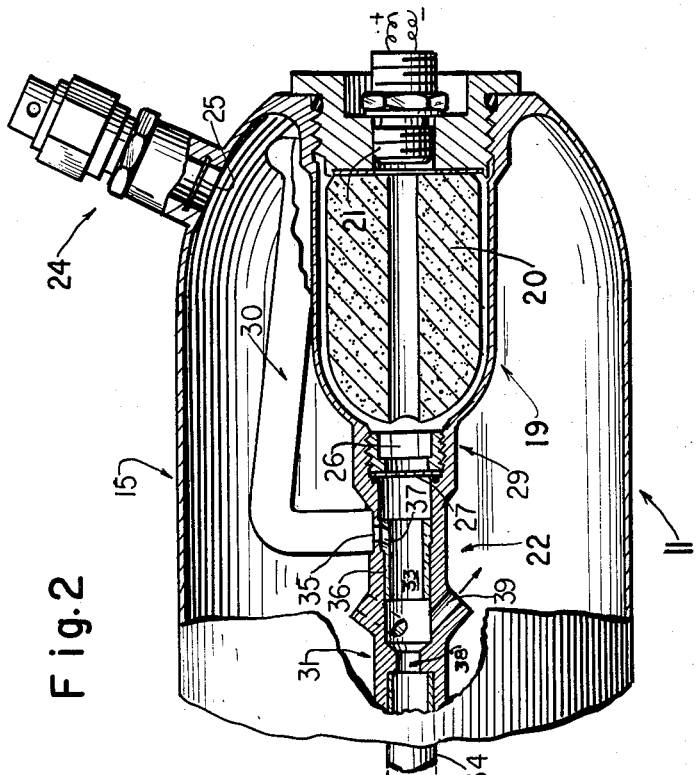

3,117,424
APPARATUS FOR GENERATING GASEOUS MIXTURES FOR INFLATING INFLATABLE DEVICES
Lester V. Hebenstreit, Bloomfield, N.J., assignor to Specialties Development Corporation, Belleville, N.J., a corporation of New Jersey
Filed Jan. 22, 1962, Ser. No. 167,519
6 Claims. (Cl. 62—48)

The present invention relates to inflating inflatable devices, and, more particularly, to improved apparatus for generating gaseous mixtures of carbon dioxide and combustion products of propellants suitable for inflating such devices.

Heretofore, various types of inflatable devices have been used extensively by the armed forces including landing pads for helicopters and flotation equipment such as rafts, boats, escape ladders and the like. More recently, it has been proposed to inflate such devices by mixing the hot gaseous combustion products of propellants such as burning powders with liquefied carbon dioxide or other refrigerants, whereby the hot gases heat and gasify the carbon dioxide to attain a desired pressure and the subsequent expansion of the carbon dioxide produces a cooling effect which reduces the temperature of the hot gases so that the mixture is at a temperature when introduced into the devices which the inflatable bag of the devices can withstand. It has also been proposed to use alcohol or other suitable liquid materials having a high latent heat of vaporization to further reduce the temperature of the gaseous mixture.

One of the difficulties which has been encountered in the use of such apparatus is that the hot combustion gases and the refrigerant are not thoroughly and uniformly admixed, particularly when the propellant is first ignited, with the result that hot spots are caused in the mixing chamber of the apparatus which burn out or weaken the structural elements of the apparatus. While the obvious suggestion would be to construct the vulnerable elements or zones of the mixing of a greater mass capable of withstanding high temperatures, this is not feasible because where such devices are airborne the weight penalty cannot be tolerated.

Accordingly, an object of the present invention is to provide improved apparatus for producing gaseous mixtures of the type indicated herein which apparatus is not subject to the foregoing disadvantages.

Another object is to provide such apparatus which is compact in arrangement and light in weight.

Another object is to provide such apparatus which assures thorough admixture of the hot gases and the refrigerant to prevent hot spots.

A further object is to provide such apparatus which is simple and economical in construction and is safe and reliable in operation.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description, and is shown in the accompanying drawing, forming a part of the specification, wherein:

FIG. 1 is a schematic view of a system utilizing apparatus in accordance with the present invention for producing a gaseous mixture for inflating an inflatable device.

FIG. 2 is an enlarged longitudinal sectional view, partly in elevation, of apparatus for producing the gaseous mixture.

FIG. 3 is a sectional view taken along the line 3—3 on FIG. 2.

Referring to the drawing in detail, a system is shown in FIG. 1 which comprises an inflatable device 10, a gas generator 11, and a conduit 12 for directly conducting a mixture of gases from the gas generator to the inflatable device.

The inflatable device 10 may be a bag of any desired shape and size used in connection with boats, rafts, rescue devices or helicopter landing pads.

The gas generator 11 for producing the mixture of gases as shown in FIG. 2 generally comprises a receptacle or a container 15 for confining carbon dioxide or other refrigerants; an outlet assembly 16 having the conduit 12 connected to its outlet 17; a valve or closure such as a pressure rupturable disc 18 for normally sealing the container and allowing discharge of the gaseous mixture through the outlet upon rupture thereof; a hot gas generating chamber 19 including a charge 20 of propellant opposite the outlet, an electrically actuated squib 21 for igniting the charge, and a distributor or flow divider 22 for conducting the hot gases from the chamber 19 to the interior of the container 15 for admixture with the carbon dioxide; and a safety disc assembly 24 including a disc 25 adapted to burst in the event an unsafe pressure is created within the container.

The container 15, as shown, preferably is generally cylindrical; and has the outlet assembly 16 at one end thereof, and has the gas generating chamber 19 secured to the other end thereof and disposed within the interior of the container. The chamber 19 has an outlet 26 facing the outlet assembly, and a pressure rupturable disc 27 normally seals the outlet 26 and allows discharge of the hot gas through the outlet 26 upon rupture thereof.

The hot gas distributor 22 generally comprises a nozzle coupling 29 secured over the outlet 26 of the gas generating chamber, a tube 30 connected to the coupling 29 for discharging hot gas in a zone at the gas generating chamber end of the container, a flow dividing coupling 31 connected in line with the coupling 29, a baffle chamber 32 enclosing the disc 18 at the side facing the interior of the container, and an elongate tube 34 which is connected at one end in line with the coupling 31 and is supported by the baffle chamber 32 at its other end in the manner described hereinafter.

The coupling 29 has a side opening 35 over which the inner end of the tube 30 is secured, and has a high temperature resistant sleeve 36 mounted therein which is provided with a bore 33 of a predetermined cross-sectional area. The sleeve 36 is formed with an orifice 37 for metering hot gas into the tube 30.

The coupling 31 has an axial orifice 38 at its downstream end for metering hot gas into the tube 34 at a reduced pressure. The coupling 31 also has one or more side openings 39 (two being shown) for metering and directing hot gas into the container in a zone between the ends of the container. Preferably, the openings 39 face the gas generating chamber end of the container and are inclined at an angle of about 45° with respect to the longitudinal axis of the container.

The outlet end of the tube 30 and the openings 39 are arranged so that hot gas is distributed circumferentially within the container as well as lengthwise. This is accomplished by locating the openings 39 about 120° apart and by locating the outlet end of the tube 30 about 120° from each opening 39 in a circumferential direction.

The baffle chamber 32 has a cylindrical side wall 40 formed with a plurality of ports 41 (four being shown) in communication with the interior of the container, and has an end wall 42 formed with a central opening 44 for cooperation with the tube 34 as about to be described.

As shown in FIG. 3, the end wall 42 has a pair of opposite spaced apart radially extending projections 45 thereon which provide a space therebetween for receiving the end of the tube 34 at the left (as viewed) and enable the tube to be secured to the wall 42 to position the outlet opening of the tube over the opening 44, whereby hot gas can be directed into the baffle chamber to effect vaporization of material such as refrigerant and/or alcohol within this chamber.

The end wall 42 also has arcuate surfaces 46, and the end of the tube 34 is cut away at an angle of about 30° at opposite wall portions to provide side outlets 47 at the end of the tube for directing hot gas against the arcuate surfaces 46, whereby these deflect the hot gas radially outwardly and towards the hot gas generating chamber end of the container.

Numerous tests were conducted with the apparatus shown and described herein wherein the container 15 had a volume of 322 cubic inches and between about 6.79 and about 7.39 pounds of carbon dioxide and between about 0.464 and about 0.641 pound of ethyl alcohol were confined within the container. It was found that a charge powder 20 in the chamber 19 weighing between about 0.57 and 0.67 pound and generating about 1740 B.t.u per pound produced sufficient hot gas to vaporize the carbon dioxide and alcohol and this hot gas was cooled by the carbon dioxide and alcohol whereby the resulting mixture of gases discharged from the apparatus and introduced into a 56 cubic foot bag had a temperature which could be tolerated by the bag and had the desired pressure to effect inflation of the bag within about four seconds or less.

In the foregoing described apparatus, the tubes 30 and 34 respectively had a bore area of about 0.125 and 0.150 square inch; the sleeve 36 had a bore area of about 0.190 square inch; and the openings, ports or orifices for metering the hot gas or the mixture of gases into these bores had the following approximate dimensions in area:

|  | Square inches |
| --- | --- |
| Opening 35 | 0.015 |
| Orifice 37 | 0.015 |
| Orifice 38 | 0.092 |
| Openings 39 | 0.036 |
| Ports 41 (4) | 0.196 |

The dimensional relationship of the areas of the orifices 37 and 38 and the openings 39 thereby determines the distribution of the hot gas at the various zones within the container to effect vaporization and admixture of the refrigerant and alcohol; and the combined area of the four ports 41 determines the rate of discharge through the outlet 17 upon rupture of the disc 18 by the pressure of the hot gas and refrigerant admixed in the container.

In the apparatus tested, the charge of powder developed an initial pressure of about 2300 p.s.i. which caused the disc 27 to burst whereby hot gas was distributed in the container to produce a gaseous mixture under pressure therein. This mixture, in about 0.2 to 0.5 second, creates a pressure of about 4000 p.s.i. in the baffle chamber which causes the disc 18 to burst to allow discharge of the mixture through the outlet 17 and into the pipe 12.

The apparatus for producing this gaseous mixture when charged with maximum amounts of refrigerant, powder and alcohol weighed about twenty four pounds. This apparatus can be safely stored at temperatures between $-65°$ F. and $165°$ F. without impairing its effectiveness when operated.

From the foregoing description, it will be seen that the present invention provides improved, lightweight apparatus for producing a large volume of a gaseous mixture suitable for inflating inflatable devices and for other purposes where an auxiliary source of pressure may be required for a single operation. This apparatus is operable in any position or attitude.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

I claim:

1. Apparatus for producing a mixture of gases under pressure comprising a receptacle for confining a refrigerant under pressure and having an outlet at one end provided with a closure disc, a chamber at the end of the receptacle opposite its outlet adapted to confine a propellant for generating hot gases in said chamber, said chamber having an outlet, baffle chamber means at the side of said disc facing the interior of said receptacle including a central opening and opening means surrounding said central opening and in communication with the interior of said receptacle, and a hot gas distributor tube having an inlet at one end connected to said chamber outlet and having outlet openings for directing hot gases into said receptacle to effect thorough admixture of the hot gases and the refrigerant and having an outlet at its other end arranged for directing hot gases into said central opening.

2. Apparatus for producing a mixture of gases under pressure comprising a receptacle for confining a refrigerant under pressure and having an outlet at one end provided with a rupturable closure disc, a chamber at the end of the receptacle opposite its outlet adapted to confine a propellant for generating hot gases in said chamber, said chamber having an outlet, a hot gas distributor tube having an inlet connected to said chamber outlet and having conduit means provided with outlet openings for directing hot gases into said receptacle at a plurality of spaced zones throughout the interior of said receptacle to effect thorough admixture of the hot gas, and the refrigerant and a baffle chamber enclosing the side of said disc facing the interior of said receptacle and having port means in communication with the interior of said receptacle, said distributor tube having a discharge opening for directing hot gases against said baffle chamber.

3. Apparatus according to claim 2, wherein one of said distributor tube outlet openings is located at the chamber end of said receptacle and other outlet openings are located between the ends of said receptacle, and said outlet openings are constructed and arranged to meter the flow of hot gases at desired rates.

4. Apparatus according to claim 2, wherein said baffle chamber has an arcuate wall surface on which hot gasses are directed for deflecting the hot gases radially outwardly within said receptacle.

5. Apparatus for producing a mixture of gases under pressure comprising a receptacle for confining a refrigerant under pressure and having an outlet at one end provided with a rupturable closure disc, a chamber at the end of the receptacle opposite its outlet adapted to confine a propellant for generating hot gases in said chamber, said chamber having an outlet, a hot gas distributor tube having an inlet connected to said chamber outlet and having conduit means provided with outlet openings for directing hot gases into said receptacle at a plurality of spaced zones throughout the interior of said receptacle to effect thorough admixture of the hot gas and the refrigerant and a baffle chamber enclosing the side of said disc facing the interior of said receptacle and having port means in communication with the interior of said receptacle, said hot gas distributor tube including an outlet opening for directing hot gases into said baffle chamber to effect vaporization of material within said baffle chamber.

6. Apparatus for producing a mixture of gases under pressure comprising a receptacle for confining a refrigerant under pressure and having an outlet at one end provided with a closure disc, a chamber at the end of the receptacle opposite its outlet adapted to confine a propellant for generating hot gases in said chamber, said chamber having an outlet, baffle chamber means at the side of said disc facing the interior of said receptacle including a central opening and side openings surrounding said central opening and in communication with the interior of said receptacle, and a hot gas distributor tube having an inlet connected to said chamber outlet and having outlet means for directing hot gases into said receptacle to effect thorough admixture of the hot gases and the refrigerant and for directing hot gases into said central opening.

References Cited in the file of this patent

UNITED STATES PATENTS

| | | |
|---|---|---|
| 2,525,597 | Frazey | Oct. 10, 1950 |
| 2,530,633 | Scholz | Nov. 21, 1950 |
| 2,671,312 | Roy | Mar. 9, 1954 |
| 2,779,281 | Maurice et al. | Jan. 29, 1957 |
| 2,902,822 | McKiernan | Sept. 8, 1959 |
| 2,920,638 | Heckethorn et al. | Jan. 12, 1960 |
| 2,964,916 | Keeping | Dec. 20, 1960 |
| 2,989,381 | Musser | June 20, 1961 |